(12) United States Patent
Eom

(10) Patent No.: US 6,793,205 B2
(45) Date of Patent: Sep. 21, 2004

(54) COMBINED HUMIDIFIER

(75) Inventor: Gwang Su Eom, Pusan (KR)

(73) Assignee: Sunbow Electronics Co., Ltd., Pusan (KR)

( * ) Notice: Subject to any disclaimer, the term of this patent is extended or adjusted under 35 U.S.C. 154(b) by 76 days.

(21) Appl. No.: 10/231,161

(22) Filed: Aug. 30, 2002

(65) Prior Publication Data
US 2003/0042629 A1 Mar. 6, 2003

(30) Foreign Application Priority Data
Aug. 31, 2001 (KR) ......................................... 2001-53254
Jul. 25, 2002 (KR) ......................................... 2002-43743

(51) Int. Cl.[7] ................................................. B01F 3/04
(52) U.S. Cl. .......................... 261/142; 261/30; 261/81
(58) Field of Search ........................... 261/30, 81, 142, 261/DIG. 48

(56) References Cited
U.S. PATENT DOCUMENTS 5,010,905 A * 4/1991 Snyder et al. .............. 132/272
5,158,716 A * 10/1992 Hirokane .................... 261/142
5,645,769 A * 7/1997 Tamaru et al. ............... 261/30
5,693,266 A * 12/1997 Jung .......................... 261/142
6,220,579 B1 * 4/2001 Chen .......................... 261/131
6,244,576 B1 * 6/2001 Tsai .......................... 261/141

* cited by examiner

Primary Examiner—Scott Bushey
(74) Attorney, Agent, or Firm—Jacobson Holman PLLC

(57) ABSTRACT

Disclosed is a combined humidifier for improving sanitary conditions, which is capable of completely sterilizing bacteria contained in moisture provided to the atmosphere in the form of a cool mist, which is capable of widely spreading the moisture in the air so as to smoothly control the humidity of the atmosphere, by instantaneously evaporating sprayed water during compulsory exhaust of the water with the aid of a blower after spraying water as a mist due to operation of an ultrasonic oscillator, wherein an evaporator having pluralities of radiating plates is installed in a passage for guiding water within the humidifier.

4 Claims, 7 Drawing Sheets

Figure 5B:
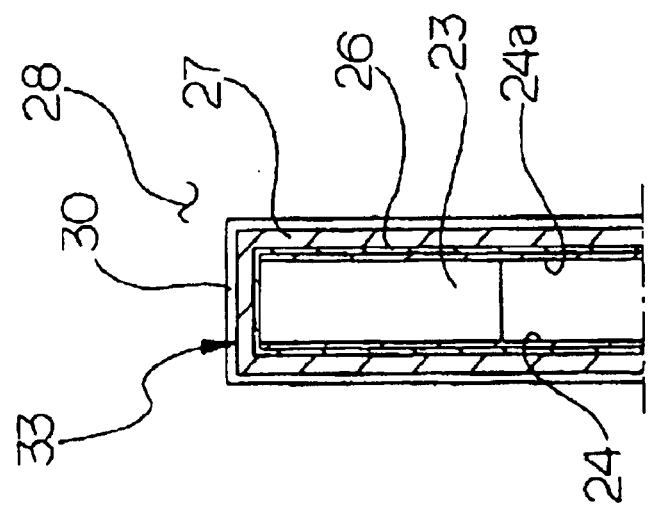
Figure 5A:
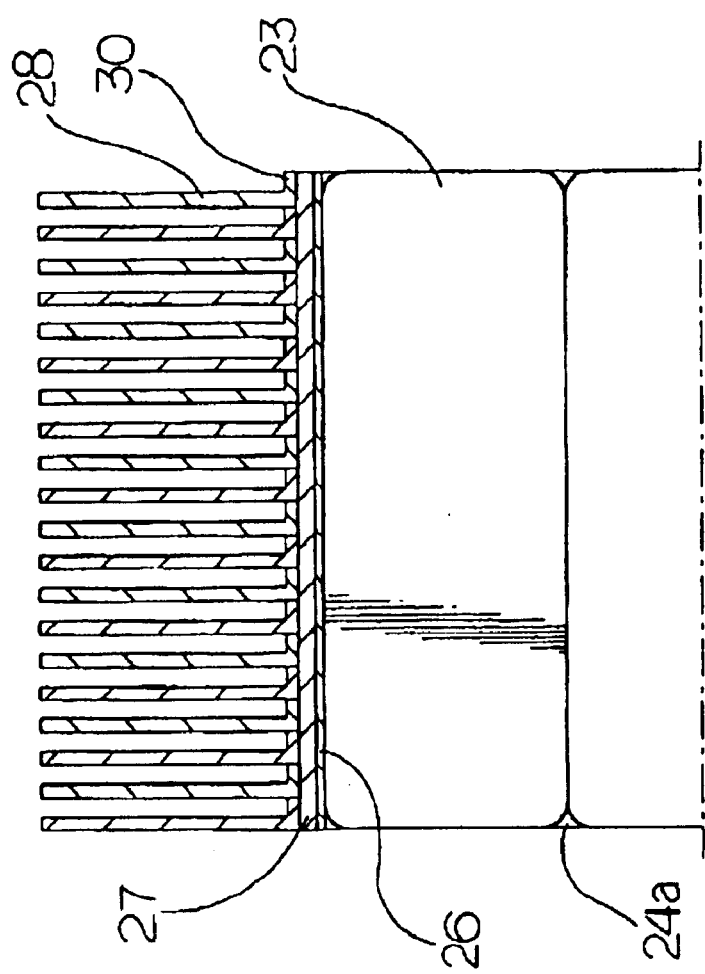

[FIG 1]
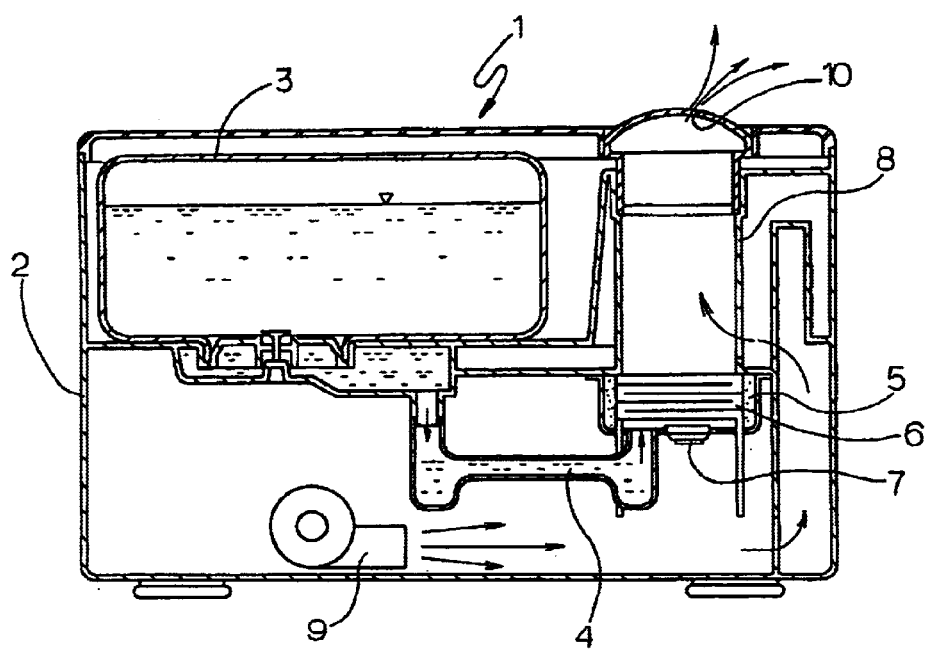
- - Prior Art - -

[FIG 2]
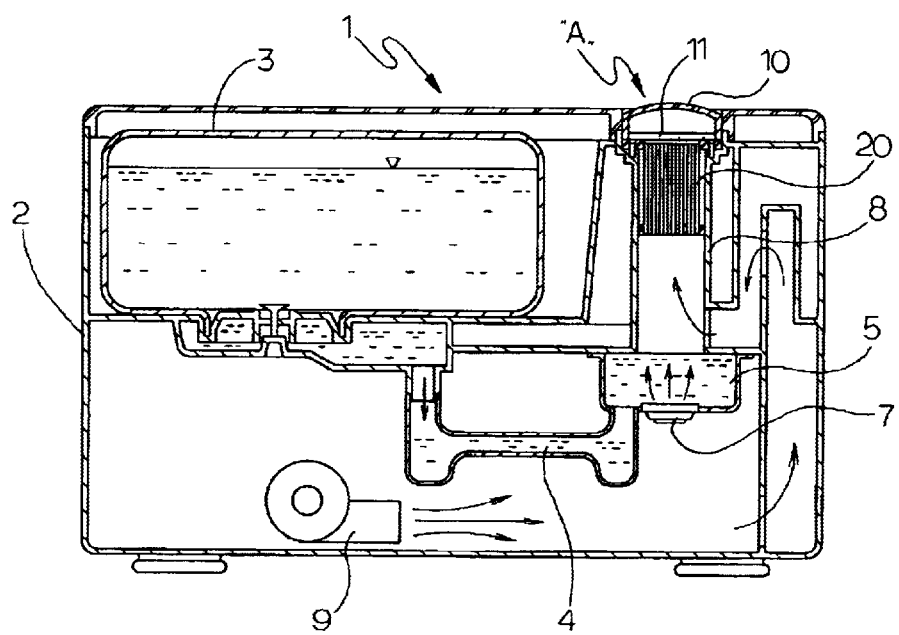
[FIG 3]
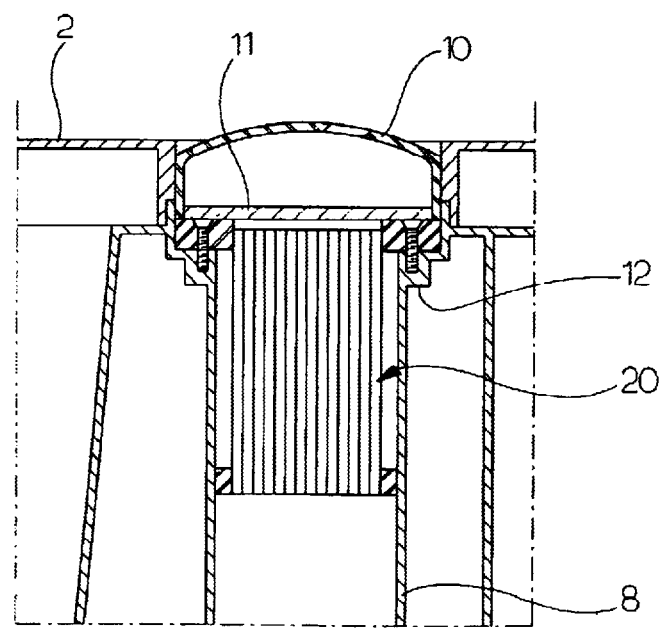

[FIG 4]
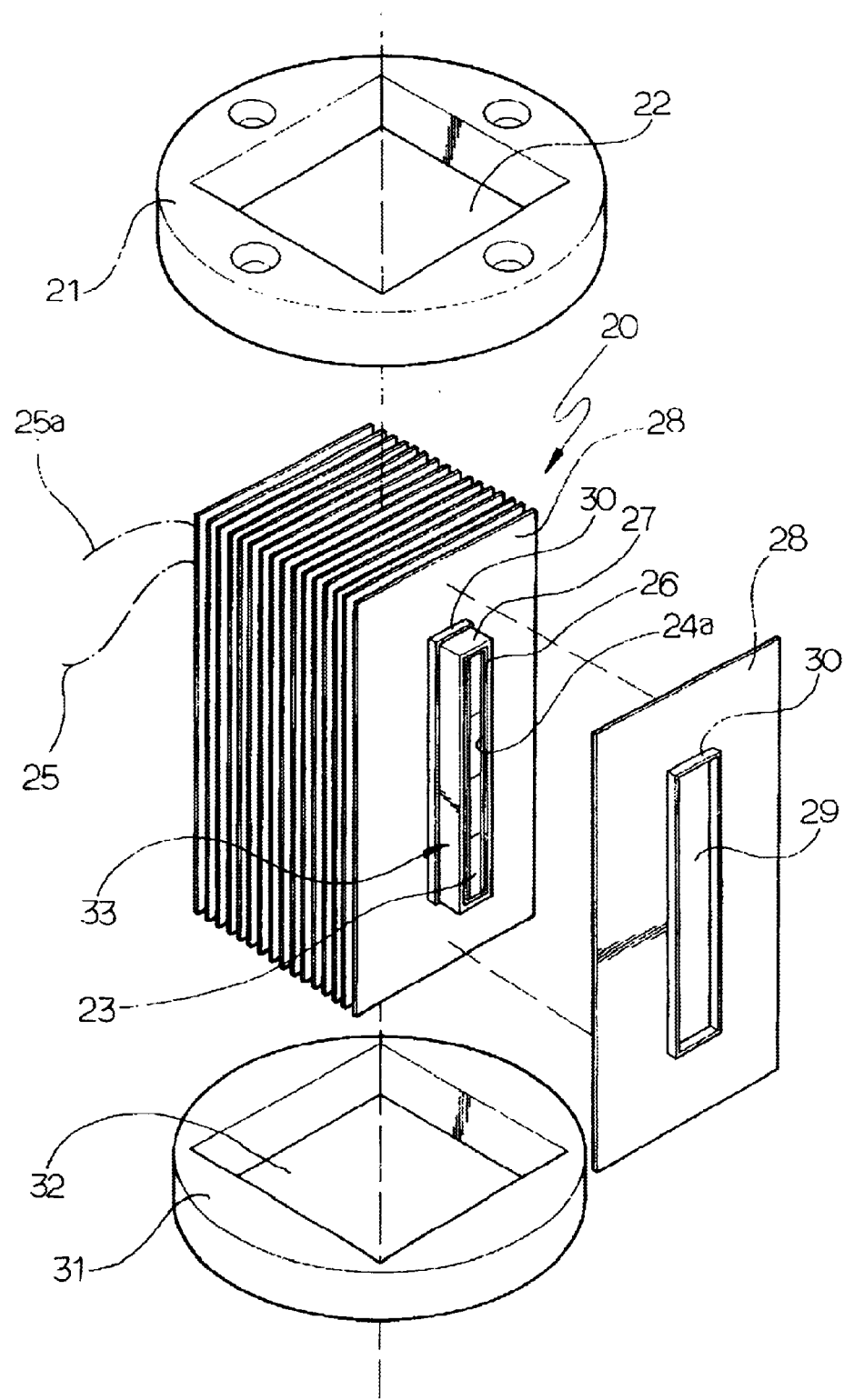

[FIG 6]
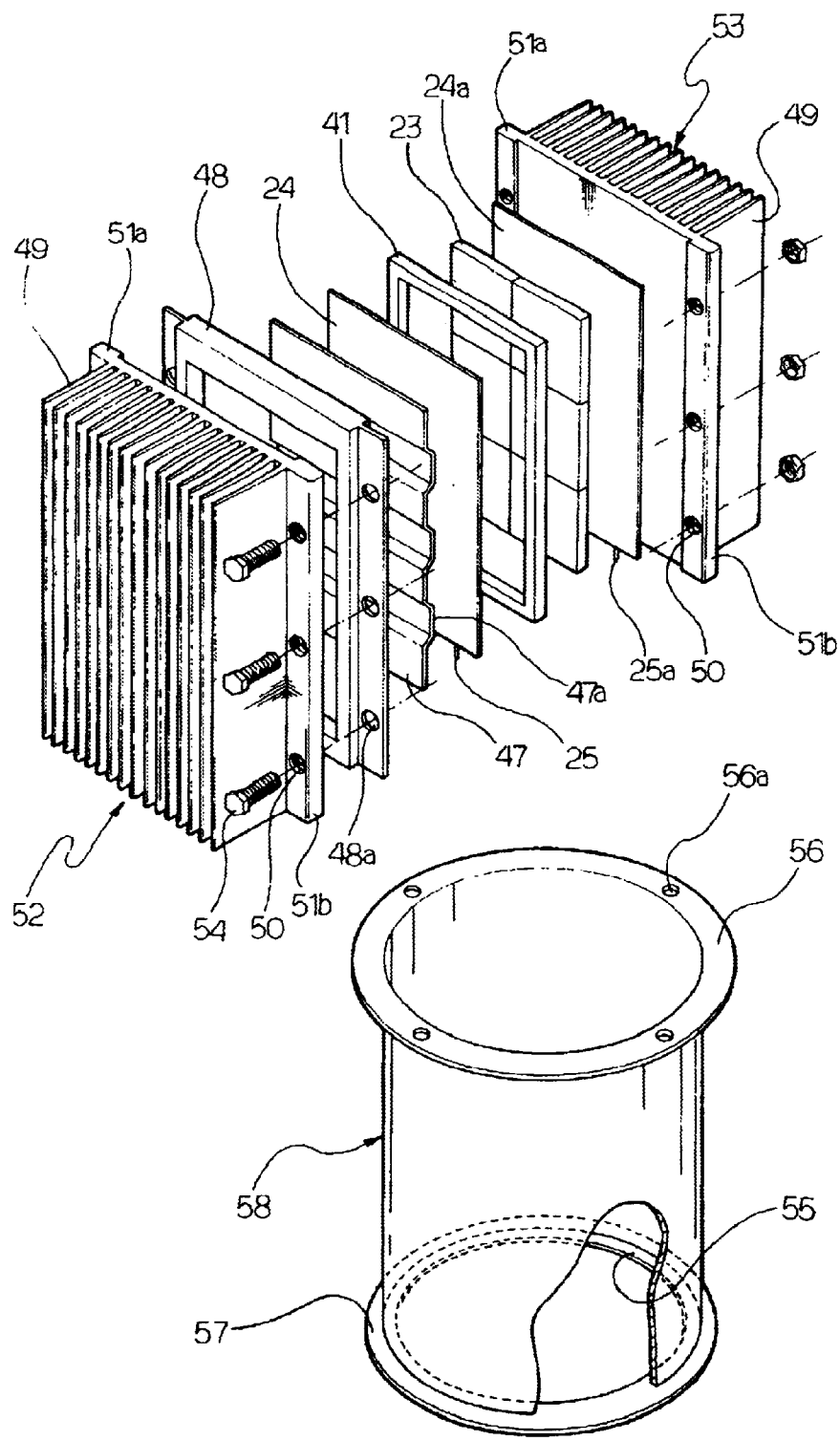

[FIG 7]
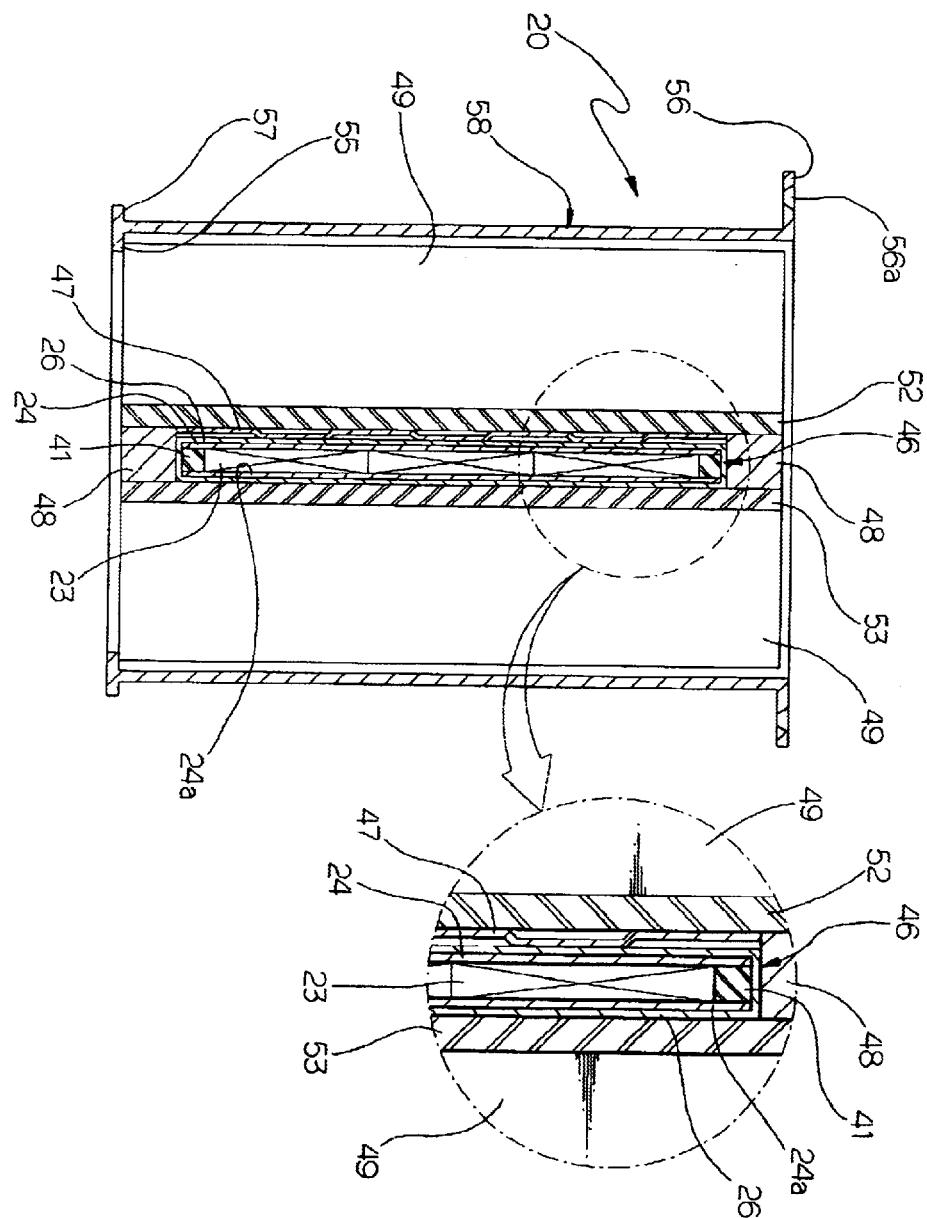

[FIG 8]
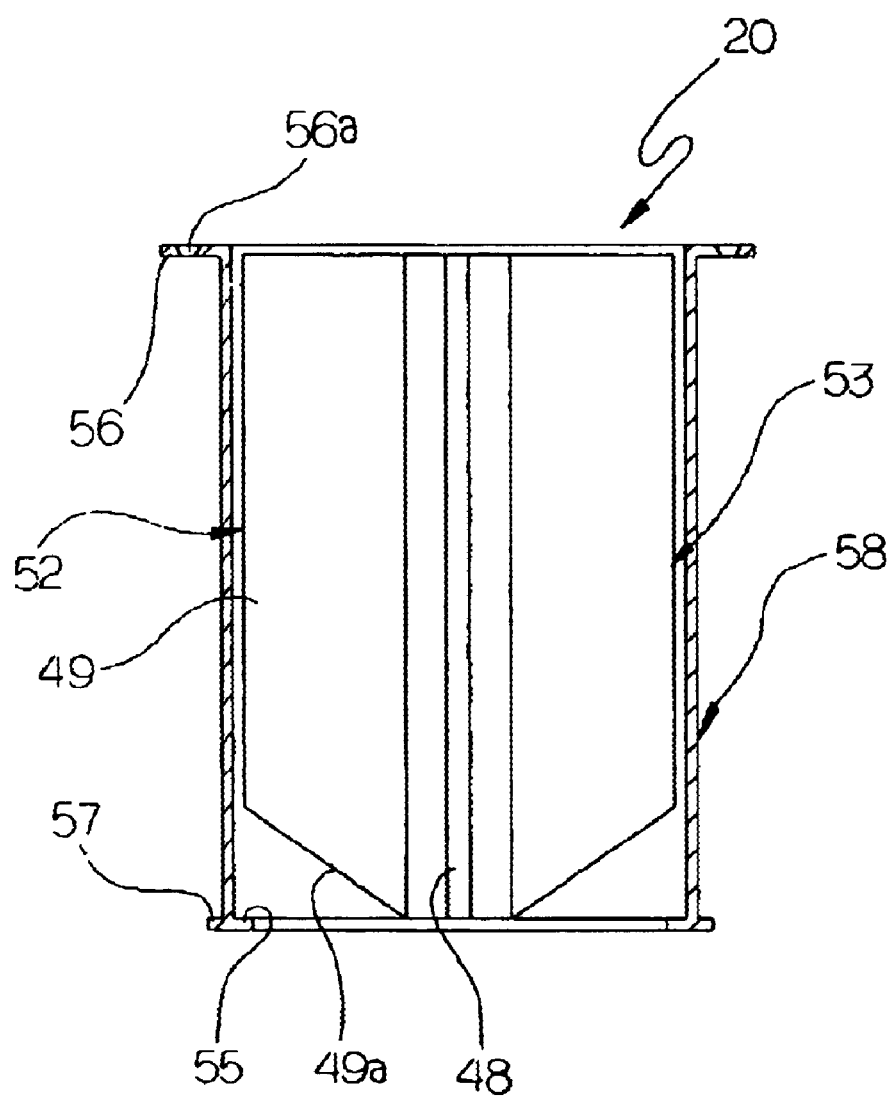

COMBINED HUMIDIFIER

BACKGROUND OF THE INVENTION

1. Field of the Invention

The present invention relates to a combined humidifier for improving sanitary conditions, and more particularly to a combined humidifier capable of completely sterilizing bacteria contained in moisture provided to the atmosphere in the form of a cool mist, which is capable of widely spreading the moisture in the air so as to smoothly control the humidity of the atmosphere, by instantaneously evaporating sprayed water during compulsory exhaust of the water with the aid of a blower after spraying water as a mist due to operation of an ultrasonic oscillator, wherein an evaporator having pluralities of radiating plates is installed in a passage for guiding water within the humidifier.

2. Description of the Prior Art

If a temperature in a room is increased due to the absence of a proper device for generating the moisture, then air in a room becomes dry. The use of a humidifier is well known to solve this problem. The humidifier is commonly used when one desires to introduce moisture in the form of a cool mist into the atmosphere to eliminate dry air soothing a sore throat or cough by maintaining a proper humidity (=about 60%). Due to the operation of the humidifier, it is possible to maintain the optimum atmosphere and to prevent difficult breathing and respiratory ailments.

The humidifiers are classified into an electrothermal humidifier and an ultrasonic humidifier on the basis of humidifying mode.

First, the electrothermal humidifier generates a vapor with heating water, which is transferred from a water tank, by using a heater or an electrode rod. However, if the electrothermal humidifier goes down due to a careless user, the user may be badly burned with overflowing water having a high temperature between 80 and 90 degrees centigrade.

Secondly, the ultrasonic humidifier is used to add moisture to the atmosphere as a cool mist by operating an oscillator submerged in the water due to generation of an electric signal having a specific frequency in an electric circuit. Since the ultrasonic humidifier sprays water having a low temperature, it drops the temperature in a room. Furthermore, it is impossible to prevent the propagation of germs in water provided to the atmosphere in the form of a cool mist. Therefore, air in a room is badly contaminated.

In order to solve these problems, there is a conventionally device which has the capacity to function as an electrothermal humidifier and an ultrasonic humidifier.

Herein below, a construction and an operation relationship of a combined humidifier according to the prior art as described above will be explained with reference to FIG. 1.

The combined humidifier according to the prior art includes a main body 2, a water tank 3 for containing water to be exhausted, a water bath 5 for receiving water from the water tank 3 through a flow tube 4 extending there between, a heater 6 for heating water at a predetermined temperature, the heater 6 being disposed in the water bath 5, an ultrasonic oscillator 7 for spraying water as a fog, the ultrasonic oscillator 7 being disposed at a lower portion of the water bath 5, a nozzle case 8 for guiding the water sprayed by the ultrasonic oscillator 7, a blower 9 for compulsorily exhausting the water sprayed by the ultrasonic oscillator 7, the blower 9 being communicated with the nozzle case 8, and a discharge part 10 for controlling a discharging direction of the water sprayed by the ultrasonic oscillator 7, the discharge part 10 being installed at an upper portion of the nozzle case 8.

In the combined humidifier as described above, water is introduced from the water tank 3 installed in the main body 2 into the water bath 5 and thereafter it is heated at a temperature between 60 and 70 degrees centigrade by means of the heater 6 such as a heating element. Then, heated water is transformed into a mist by means of an ultrasonic vibration due to operation of the ultrasonic oscillator 7 and is compulsory cooled at temperature between 30 and 40 degrees centigrade and thereafter it is compulsory exhausted to the outside.

Although the temperature (=60 and 70 degrees centigrade) of water in the water bath 5 is low compared to the electrothermal humidifier, there is a problem that an orphan or a child may be badly burned when the water in the water bath 5 overflows due to overturn of the humidifier 1.

Furthermore, in the combined humidifier according to the prior art, water contained in the water bath 5 is heated at temperature between 60 and 70 degrees centigrade by operating the heater 6 installed in the water bath 5. Under this state, water heated by the heater 6 is forcibly cooled by wind generated from the blower 9 and is transformed into a cool mist by operating an oscillator submerged in the water. Accordingly, it is impossible to completely sterilize bacteria contained in moisture provided to the atmosphere in the form of a cool mist. Since water being exhausted by the combined humidifier 1 keeps liquefied, the fluidity of water particle remarkably deteriorates. As a result, it is impossible to widely spread the moisture in the air. Consequently, the moisture generated from the humidifier 1 cannot be spread to the air and is concentrated at a position adjacent to the humidifier 1. Therefore, it is possible to obtain the sufficient humidifying effect in the conventional combined humidifier 1.

SUMMARY OF THE INVENTION

The present invention is contrived to solve the foregoing problems. An object of the present invention is to provide a combined humidifier for improving sanitary conditions, which is capable of completely sterilizing bacteria contained in moisture, which is provided to the atmosphere in the form of a cool mist, which is capable of widely spreading the moisture in the air so as to smoothly control the humidity of the atmosphere, by instantaneously evaporating sprayed water during compulsory exhaust of the water with the aid of a blower after spraying water as a mist due to operation of an ultrasonic oscillator, wherein an evaporator having pluralities of radiating plates is installed in a passage for guiding water within the humidifier.

In order to achieve the above object, the present invention provides a combined humidifier including a main body, a water tank for containing water to be exhausted, a water bath for receiving water exhausted from the water tank through a flow tube extending between the water tank and the water bath, an ultrasonic oscillator for spraying water as a mist, the ultrasonic oscillator being disposed at a lower portion of the water bath, a nozzle case for guiding water sprayed by the ultrasonic oscillator, a blower for compulsorily exhausting water sprayed by the ultrasonic oscillator, the blower being communicated with the nozzle case, and a discharge part for controlling a discharging direction of water sprayed by the ultrasonic oscillator, the discharge part being installed at an upper portion of the nozzle case, characterized by comprising:

a shoulder part being formed at an upper inner periphery of the nozzle case;

an evaporator for evaporating water sprayed by the ultrasonic oscillator being installed and fixed at an upper surface of the shoulder part; and a net-shaped screen plate for protecting the evaporator being installed at an upper end of the evaporator.

As described above, the combined humidifier according to the present invention can completely sterilize bacteria contained in moisture, which is provided to the atmosphere in the form of a cool mist. Furthermore, it can widely spread the moisture in the air so as to smoothly control the humidity of the atmosphere by instantaneously evaporating sprayed water during compulsory exhaust of the water with the aid of a blower after spraying water as a mist due to operation of an ultrasonic oscillator.

BRIEF DESCRIPTION OF THE DRAWINGS

The above object and other characteristics and advantages of the present invention will become more apparent by describing in detail preferred embodiments thereof with reference to the attached drawings, in which:

FIG. 1 is a sectional view for schematically showing the construction of a combined humidifier according to the prior art;

FIG. 2 is a sectional view for schematically showing the construction of a combined humidifier according to the present invention;

FIG. 3 is a partially enlarged view of the "A" part shown in FIG. 2;

FIG. 4 is an exploded perspective view of an evaporator according to a preferred first embodiment of the present invention;

FIG. 5A is a partially side sectional view for showing a combining state of the evaporator illustrated in FIG. 4;

FIG. 5B is a partially front sectional view for showing the combining state of the evaporator illustrated in FIG. 4;

FIG. 6 is an exploded perspective view of an evaporator according to a preferred second embodiment of the present invention;

FIG. 7 is a sectional view for showing a combining state of the evaporator illustrated in FIG. 6; and FIG. 8 is an exploded perspective view of an evaporator according to a preferred third embodiment of the present invention.

DETAILED DESCRIPTION OF THE INVENTION

Hereinafter, preferred embodiments of the present invention will be explained in more detail with reference to the accompanying drawings.

Referring now to FIG. 2, a humidifier according to the present invention includes a main body 2, a water tank 3 for containing water to be exhausted, a water bath 5 for receiving water from the water tank 3 through a flow tube 4 extending the water tank 3 and the water bath 5, an ultrasonic oscillator 7 for spraying water as a mist, the ultrasonic oscillator 7 being disposed at a lower portion of the water bath 5, a nozzle case 8 for guiding the water sprayed by the ultrasonic oscillator 7, a blower 9 for compulsorily exhausting the water sprayed by the ultrasonic oscillator 7, the blower 9 being communicated with the nozzle case 8, and a discharge part 10 for controlling a discharging direction of the water sprayed by the ultrasonic oscillator 7, the discharge part 10 being installed at an upper portion of the nozzle case 8.

FIG. 3 shows a main part of the combined humidifier according to the present invention.

As shown in FIG. 3, a shoulder part 12 is formed at an upper inner periphery of the nozzle case 8. An evaporator 20 for evaporating the water sprayed by the ultrasonic oscillator 7 is installed and fixed at an upper surface of the shoulder part 12. A net-shaped screen plate 11 for protecting the evaporator 20 is installed at an upper end of the evaporator 20.

The evaporator 20 may be operated in accordance with various operating modes, which are employed in typical electrical heating appliances, such as a coil operating mode, a resistance element operating mode, an electrothermal wire operating mode so as to generate a heat between 300 and 400 degrees centigrade by receiving an electric current from an outer electric source.

Herein below, preferred embodiments of the evaporator that is a main part of the combined humidifier according to the present invention will be explained in detail with reference to FIGS. 4 to 8.

Referring now to FIGS. 4 and 5, the evaporator 20 includes an exothermic member 23 for generating a heat by receiving an electric current, electrode plates 24,24*a* being installed at both sides of the exothermic member 23, an insulating tape 26 being attached to outer side surfaces of the electrode plates 24,24*a* with enclosing the electrode plates 24,24*a*, and an exothermic part 33 being installed at an outer side surface of the insulating tape 26. At this time, electric wires 25,25*a* for supplying the exothermic member 23 with an electric current are connected to the electrode plates 24,24*a*. The exothermic part 33 comprises a supporting plate 27 for protecting the exothermic member 23 and the electrode plates 24,24*a*. Preferably, the supporting plate 27 comprises aluminum.

Pluralities of radiating plates 28 are disposed at an outer periphery surface of the exothermic part 33. Preferably, the radiating plates 28 comprise aluminum or a stainless steel. In order to dispose the radiating plates 28 at the outer periphery surface of the exothermic part 33, a first insertion hole 29 is formed through a middle portion of the radiating plate 28, respectively. Furthermore, a protrusion 30 protrudes from a surface of the radiating plate 28 at a position adjacent to the first insertion hole 29, respectively. A setting plate 21 is fitted onto upper portions of the radiating plates 28 disposed at the outer periphery surface of the exothermic part 33. A fixing plate 31 is fitted onto lower portions of the radiating plates 28 disposed at the outer periphery surface of the exothermic part 33. For this purpose, a second insertion hole 22 for inserting the upper portions of the radiating plates 28 there through is formed through the setting plate 21 and a third insertion hole 32 for inserting the lower portions of the radiating plates 28 there through is formed through the fixing plate 31. Preferably, the setting plate 21 and the fixing plate 31 comprise Bakelite or a polyphenylene sulfide.

Meanwhile, the exothermic member 23 comprises a positive temperature coefficient thermistor (=PTC). This PTC is one of resistance elements formed of a principal ingredient comprising barium titanate. Under the state that electric wires are connected with the PTC, if an electric current is applied to the PTC through the electric wires, the PTC generates heat. If a temperature of the PTC is over a critical temperature, the resistance of the PTC is highly increased. Consequently, the electric current decreases and thereby the PTC does not generate a heat.

The insulating tape 26 comprises a Kapton tape and encloses the electrode plates 24,24*a* installed at both sides of the exothermic member 23. Due to installation of the insulating tape 26, the electrodes 24,24a and the supporting plate 27 are not charged with electricity. Laminating the polyamide film and the silicon adhesive agent on the surface of the polyamide film can produce the insulating tape 26. Since the insulating tape 26 has excellent heat-resistance and insulation resistance, it can be used for manufacturing the PCB substrate and for insulating aircraft parts and electrical appliance parts.

Herein below, an operation of the evaporator according to the preferred first embodiment of the present invention will be explained.

First, the water contained in the water tank 3 installed in the main body 2 of the combined humidifier according to the present invention is introduced into the water bath 5 through the flow tube 4. Under this state, an electric current is applied to the electrode plates 24,24a installed at both sides of the exothermic member 23 via the electric wires 25,25a. When the electric current passes through the exothermic member 23, a heat between 250 and 350 degrees centigrade may be generated. At this time, the net-shaped screen plate 11 installed at the upper end of the evaporator 20 prevents the exothermic member 23 having the high-temperature heat from being exposed to the outside.

When the exothermic member 23 of the evaporator 20 generates a heat by receiving an electric current, the water contained in the water bath 5 is sprayed into the nozzle case 8 due to the operation of the ultrasonic oscillator 7 mounted to the lower portion of the water bath 5. Within the nozzle case 8, the water floats as a minute waterdrop and continuously is compulsorily transferred to the upper portion of the nozzle case 8 due to the wind generated by the blower 9. At this time, the water passes through the evaporator 20 generating the high-temperature heat, which is installed and fixed at the shoulder part 12 formed at the upper portion of the nozzle case 8. Since the radiating plates 28 of the evaporator 20 are spaced from each other by means of the protrusions 30 protruding from the outer periphery of the first insertion hole 29 formed through the radiating plate 28, the water evaporates due to the heat generated from the exothermic member 23 in the evaporator 20. Then, the evaporated water is exhausted to the outside through the discharge part 10 as a vapor. At this time, the vapor has a temperature between 50 and 70 degrees centigrade.

When the water changed into the minute waterdrop passes through between the radiating plates 28 spaced apart from each other, bacteria contained in the water is completely sterilized due to the heat emitted from the radiating plate 28 heated at high temperature. Since the water is changed into the vapor having an excellent fluidity, the vapor can be widely diffused. Consequently, the total humidity of the interior of a room can be efficiently controlled.

FIGS. 6 and 7 show the evaporator according to the preferred second embodiment of the present invention.

Referring to FIGS. 6 and 7, the evaporator includes an exothermic member 23 for generating a heat by receiving an electric current, an exothermic member guide 41 for receiving the exothermic member 23, electrode plates 24,24a being installed at both sides of the exothermic member guide 41, an exothermic part 46 being installed at outer side surfaces of the electrode plates 24,24a, a pair of exothermic covers 52,53 engaged with each other by means of pluralities of bolts 54, and a case 58 installed to the outside of the exothermic covers 52,53.

At this time, the exothermic part 46 comprises an insulating tape 26, which is attached to the outer side surfaces of the electrode plates 24,24a with enclosing the electrode plates 24,24a. Furthermore, electric wires 25,25a for supplying the exothermic member 23 with an electric current are connected to the electrode plates 24,24a.

A spring plate 47 and a packing member 48 are disposed at positions adjacent to the exothermic part 46. Pluralities of elastic parts 47a are formed at a middle portion of the spring plate 47. Pluralities of first through holes 48a are formed through both side ends of the packing member 48.

Pluralities of exothermic pins 49 protrude from one-side surfaces of the exothermic covers 52,53. Further, a pair of engaging parts 51a, 51b are formed at both side ends of the exothermic covers 52,53, respectively. Pluralities of bolt through holes 50 are formed through the engaging parts 51a,51b. The exothermic covers 52,53 are engaged with each other by inserting the bolt 54 into the bolt through holes 50 and the first through hole 48a.

The exothermic covers 52,53 are inserted into a through opening that is formed through the case 58 in the longitudinal direction. A locking stage 55 is formed at a lower inner periphery surface of the case 58. An installation flange 56 is formed at an upper outer periphery surface of the case 58 and a supporting flange 57 is formed at a lower outer periphery surface of the case 58. At this time, pluralities of second through holes 56a are formed through the installation flange 56.

Herein below, an assembling process of the preferred second embodiment of the evaporator according to the present invention as described above will be explained.

As shown in FIGS. 6 and 7, the exothermic member 23 is inserted into the exothermic member guide 41 and thereafter the electrode plates 24,24a are closely contacted with both sides of the exothermic member guide 41. Then, the insulating tape 26 firmly encloses the electrode plates 24,24a and thereby the exothermic part 46 are produced.

A spring plate 47 and a packing member 48 are disposed at positions adjacent to the exothermic part 46. Preferably, the packing member 48 comprises heat-resisting silicon. Pluralities of elastic parts 47a are formed at a middle portion of the spring plate 47. Pluralities of first through holes 48a are formed through both side ends of the packing member 48.

Pluralities of exothermic pins 49 protrude from one-side surfaces of the exothermic covers 52,53. Further, a pair of engaging parts 51a, 51b are formed at both side ends of the exothermic covers 52,53, respectively. Pluralities of bolt through holes 50 are formed through the engaging parts 51a, 51b. The exothermic covers 52,53 are engaged with each other by inserting the bolt 54 into the bolt through holes 50 and the first through hole 48a.

The exothermic covers 52,53 are inserted into a through opening that is formed through the case 58 in the longitudinal direction. A locking stage 55 is formed at a lower inner periphery surface of the case 58. An installation flange 56 is formed at an upper outer periphery surface of the case 58 and a supporting flange 57 is formed at a lower outer periphery surface of the case 58. At this time, pluralities of second through holes 56a are formed through the installation flange 56.

The exothermic member guide 41 for receiving the exothermic member 23 comprises Bakelite or a polyphenylene sulfide (=PPS). Accordingly, the exothermic member guide 41 is not melted at a high temperature and has a function to firmly fix the exothermic member 23.

The case 58 is used to install the exothermic covers 52,53 having the exothermic part 46 in the nozzle case 8. Since the case 58 comprises a polybutyrene terephthalate resin, it is possible to maintain it's an initial state without being melted by a high-temperature heat generated from the exothermic covers 52,53 and thereby it can firmly support the exothermic covers 52,53.

Due to this structure as described above, in the preferred second embodiment of the evaporator according to the present invention, the exothermic part 46 having the exothermic member 23 therein is contacted with the exothermic covers 52,53 having the exothermic pins 49 at a wide sectional area and then it closely approaches toward the exothermic covers 52,53 due to the operation of the elastic part 47a of the spring plate 47. Accordingly, the heat generated from the exothermic part 46 is directly transmitted to the exothermic pins 49 and thereby heat loss greatly decreases. Consequently, heat effect by radiation is highly increased and a vaporization operation of a water particle sprayed by an ultrasonic vibration generated from the ultrasonic oscillator may be smoothly performed. Since the exothermic pins 49 are integrally formed with the exothermic covers 52,53 during the manufacture of the evaporator 20, it is possible to easily assemble the evaporator 20. Accordingly, the time required to assemble the evaporator 20 decreases and thereby the productivity is highly enhanced.

FIG. 8 is an exploded perspective view of the evaporator according to the preferred third embodiment of the present invention.

As shown in FIG. 8, an inclined portion 49a is formed at a lower end of the exothermic pin 49 of the exothermic covers 52,53, respectively. Although water particles sprayed as cool mist are cohered together and create waterdrops between the exothermic pins 49, the waterdrops flow downwards and move along the inclined portion 49a formed at the lower end of the exothermic pins 49. Then, the waterdrops are collected at a distal end of the inclined portion 49a and thereby large waterdrops are created. These large waterdrops are released from the lower end of the exothermic pins 49 and move downwards their own weight into the water bath 5. Accordingly, it is possible to prevent the passage between the inclined portion 49a from being blocked owing to the cohered waterdrops. Consequently, it is possible to maintain a predetermined humidification.

As described above, in the combined humidifier according to the present invention, the evaporator having pluralities of radiating plates is installed in the passage for guiding water within the humidifier. Due to the operation of the evaporator according to the preferred embodiments of the present invention, the combined humidifier can completely sterilize bacteria contained in moisture, which is provided to the atmosphere in the form of a cool mist. Furthermore, it can widely spread the moisture in the air so as to smoothly control the humidity of the atmosphere by instantaneously evaporating sprayed water during compulsory exhaust of the water with the aid of a blower after spraying water as a mist due to operation of an ultrasonic oscillator. Consequently, it is possible to improve sanitary conditions.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A combined humidifier including a main body (2), a water tank (3) for containing water to be exhausted, a water bath (5) for receiving water exhausted from the water tank (3) through a flow tube (4) extending between the water tank (3) and the water bath (5), an ultrasonic oscillator (7) for spraying water as a mist, the ultrasonic oscillator (7) being disposed at a lower portion of the water bath (5), a nozzle case (8) for guiding water sprayed by the ultrasonic oscillator (7), a blower (9) for compulsorily exhausting water sprayed by the ultrasonic oscillator (7), the blower (9) being communicated with the nozzle case (8), and a discharge part (10) for controlling a discharging direction of water sprayed by the ultrasonic oscillator (7), the discharge part (10) being installed at an upper portion of the nozzle case (8), characterized by comprising:

a shoulder part (12) being formed at an upper inner periphery of the nozzle case (8);

an evaporator (20) for evaporating water sprayed by the ultrasonic oscillator (7) being installed and fixed at an upper surface of the shoulder part (12); and a net-shaped screen plate (11) for protecting the evaporator (20) being installed at an upper end of the evaporator (20).

2. A combined humidifier according to claim 1, characterized by the fact of the evaporator (23) including an exothermic member (23) for generating a heat by receiving an electric current, electrode plates (24), (24a) being installed at both sides of the exothermic member (23), an insulating tape (26) being attached to outer side surfaces of the electrode plates (24), (24a) with enclosing the electrode plates (24), (24a), and an exothermic part (33) being installed at an outer side surface of the insulating tape (26), in which electric wires (25), (25a) for supplying the exothermic member (23) with an electric current are connected to the electrode plates (24), (24a), the exothermic part (33) comprises a supporting plate (27) for protecting the exothermic member (23) and the electrode plates (24), (24a), in which pluralities of radiating plates (28) are disposed at an outer periphery surface of the exothermic part (33), a first insertion hole (29) is formed through a middle portion of the radiating plate (28) in order to dispose the radiating plates (28) at the outer periphery surface of the exothermic part (33), in which a setting plate (21) is fitted onto upper portions of the radiating plates (28) disposed at the outer periphery surface of the exothermic part (33), a fixing plate (31) is fitted onto lower portions of the radiating plates (28) disposed at the outer periphery surface of the exothermic part (33), a second insertion hole (22) for inserting the upper portions of the radiating plates (28) there through is formed through the setting plate (21) and a third insertion hole (32) for inserting the lower portions of the radiating plates (28) there through is formed through the fixing plate (31).

3. A combined humidifier according to claim 1, characterized by the fact of the evaporator (20) including an exothermic member (23) for generating a heat by receiving an electric current, an exothermic member guide (41) for receiving the exothermic member (23) therein, electrode plates (24), (24a) being installed at both sides of the exothermic member guide (41), an exothermic part (46) being installed at outer side surfaces of the electrode plates (24), (24a), a pair of exothermic covers (52), (53) being engaged with each other by means of pluralities of bolts (54), and a case (58) being installed to the outside of the exothermic covers (52), (53), in which the exothermic part (46) comprises an insulating tape (26) which is attached to the outer side surfaces of the electrode plates (24), (24a) with enclosing the electrode plates (24), (24a), electric wires (25), (25a) for supplying the exothermic member (23) with an electric current are connected to the electrode plates (24), (24a), in which a spring plate (47) and a packing member (48) are disposed adjacent to the exothermic part (46), pluralities of elastic parts (47a) are formed at a middle portion of the spring plate (47), pluralities of first through holes (48a) are formed through both side ends of the packing member (48), in which a through opening is formed through the case (58) in the longitudinal direction, a locking stage (55) is formed at a lower inner periphery surface of the case (58), an installation flange (56) is formed at an upper portion of the case (58) and a supporting flange (57) is formed at a lower portion of the case (58), and pluralities of second through holes (56a) are formed through the installation flange (56).

4. A combined humidifier according to claim 3, characterized by the fact of inclined portions (49a) being formed at lower ends of the exothermic pins (49) of the exothermic covers (52), (53).

* * * * *